United States Patent [19]
Provence

[11] Patent Number: 6,139,190
[45] Date of Patent: Oct. 31, 2000

[54] BEARING ASSEMBLY

[75] Inventor: Marc Provence, Annecy, France

[73] Assignee: DANA Corporation, Toledo, Ohio

[21] Appl. No.: 09/331,352

[22] PCT Filed: Dec. 2, 1997

[86] PCT No.: PCT/EP97/06952

§ 371 Date: Jun. 17, 1999

§ 102(e) Date: Jun. 17, 1999

[87] PCT Pub. No.: WO98/27347

PCT Pub. Date: Jun. 25, 1998

[30]   Foreign Application Priority Data

Dec. 19, 1996 [GB]   United Kingdom .................. 9626378

[51] Int. Cl.$^7$ .............................. F16C 27/02; F16C 27/06
[52] U.S. Cl. ............................................................. 384/273
[58] Field of Search ..................................... 384/273, 300, 384/222, 906, 295

[56]       References Cited

U.S. PATENT DOCUMENTS

| 2,851,314 | 9/1958 | Thomson | 308/26 |
|---|---|---|---|
| 3,976,340 | 8/1976 | Pitner | 308/184 R |
| 4,518,205 | 5/1985 | Heathe | 308/3 R |
| 4,600,317 | 7/1986 | Mori | 384/117 |
| 4,895,391 | 1/1990 | Groat | 280/779 |

FOREIGN PATENT DOCUMENTS

2714126 A1   6/1995   France ........................ F16C 33/08

OTHER PUBLICATIONS

International Search Report mailed Apr. 17, 1998 for PCT/EP97/06952.

*Primary Examiner*—Dirk Wright
*Attorney, Agent, or Firm*—Myers Bigel Sibley & Sajovec, P.A.

[57]         ABSTRACT

An improved bearing is disclosed which runs without clearance, and in which any wear is retrofitted automatically. This is achieved by a bearing assembly comprising a bearing (3) having an axial split (5) and an antifriction lining, and an elastic element (4), in which the elastic element exerts a force on the bearing acting to close the axial split. The presence of a shaft (1) in the bearing (3) opens the axial split (5), creating a permanent pressure acting to close the axial split (5) in the bearing. The end of the bearing life is attained when wear is sufficient to allow the axial split to close.

3 Claims, 3 Drawing Sheets

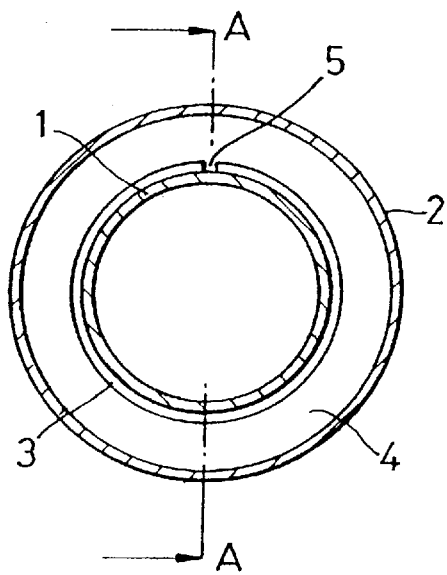
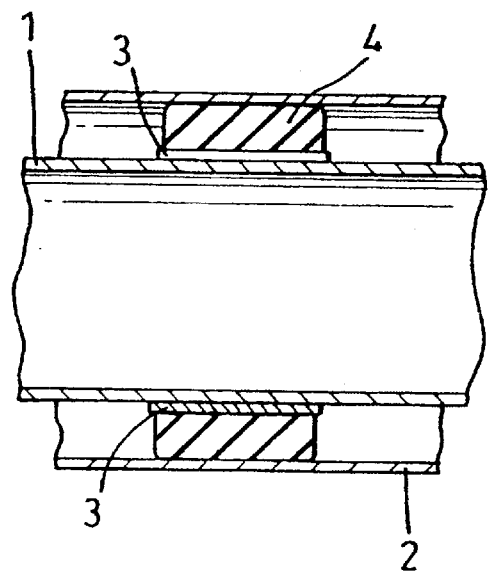
Fig. 1  Fig. 2
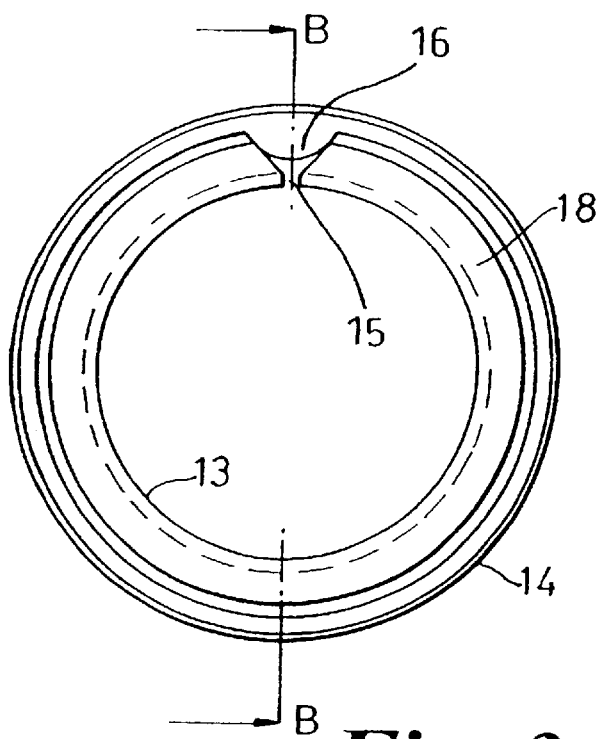
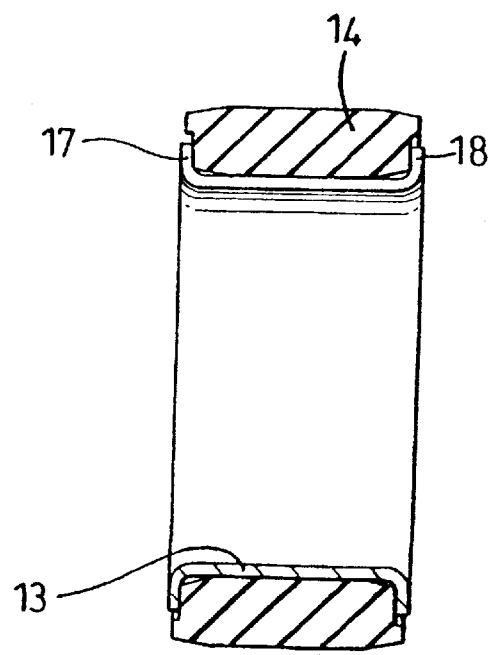
Fig. 3  Fig. 4

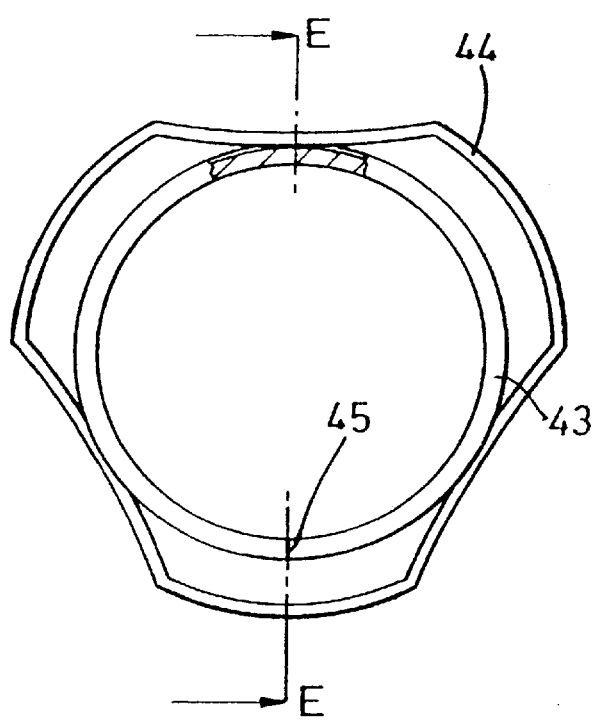 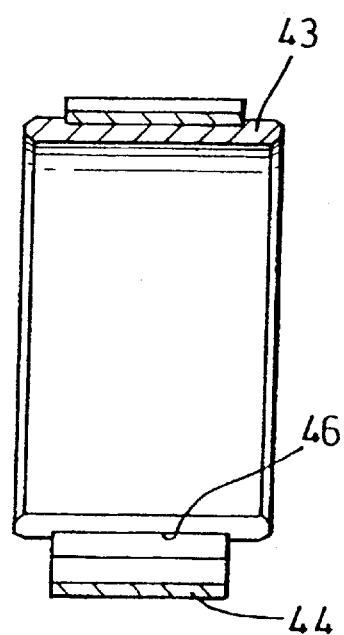
Fig. 5  Fig. 6

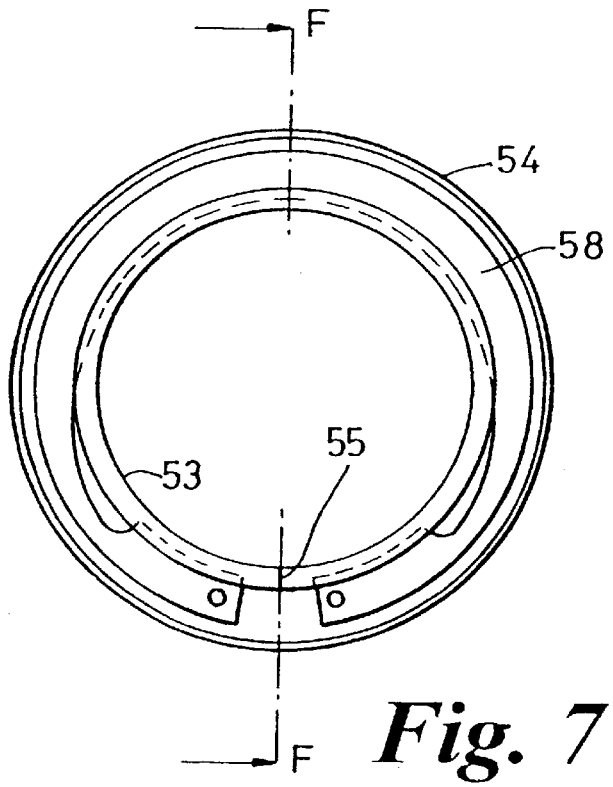
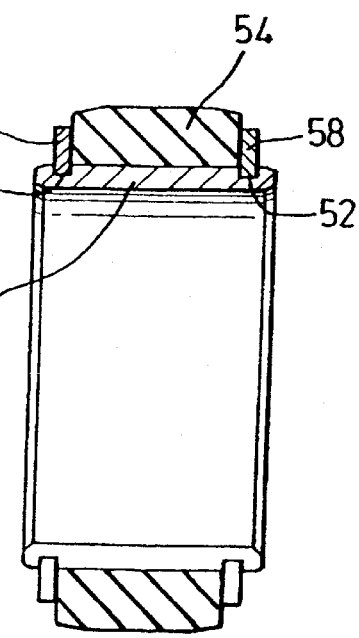
Fig. 7  Fig. 8
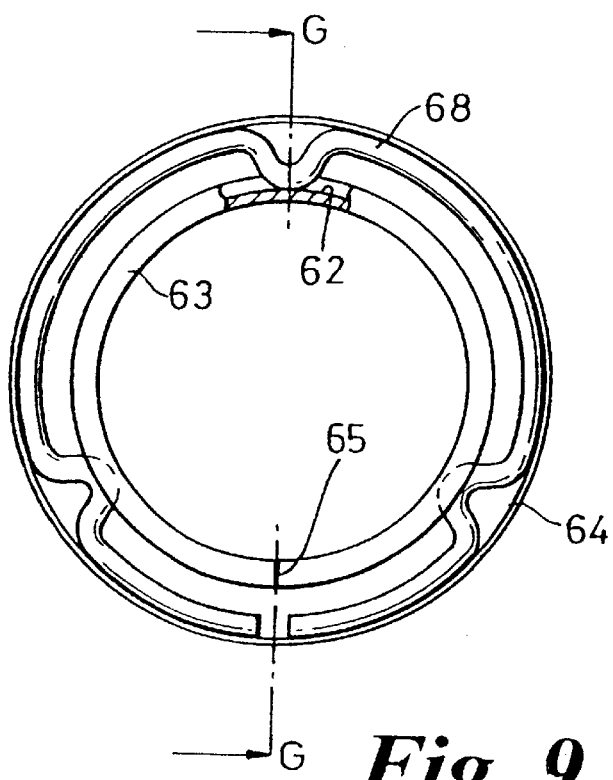
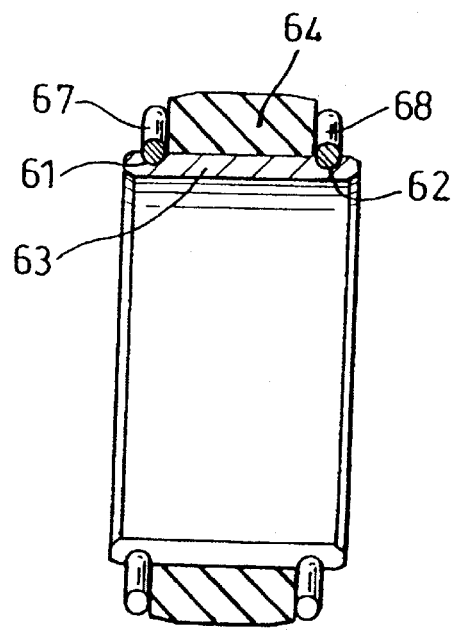
Fig. 9  Fig. 10

BEARING ASSEMBLY

The present invention relates to an improved design of shaft bearing having particular relevance to a bearing for a steering column in an automotive vehicle.

A steering column includes all of the elements necessary to enable motions of a steering wheel to be transmitted to a steering rack. A column includes a mounting tube attached to a vehicle passenger cell in which a shaft linking together the steering wheel and the rack is guided in rotation. The shaft is supported in the mounting tube by a number of bearings. In many cases, the mounting tube is constructed from a steel tube on which are fixed flanges for attachment to the passenger cell. In some cases the mounting tube is diecast from aluminium and the surfaces for supporting the mounting are machined.

It is known to support and guide the shaft inside the mounting tube by means of needle bearings and ball bearings. Known needle bearings are described in and known from EP 0 554 144 A1. Another known bearing for this purpose is described in EP 0 448 847A1.

When used in steering columns, bearings must satisfy a number of conditions. Car manufacturers specify the mounting, speed and temperature conditions in which the bearings must operate. Bearings must also allow steering wheel stresses to be transmitted via the shaft axis and must run silently. Further, the bearings must keep their properties during the life of the steering column despite the various environmental factors encountered, including the levels of temperature, humidity and grease.

Needle bearings can be expensive to manufacture. It is an advantage of the present invention that it provides for less expensive manufacture of a bearing assembly but provides for similar levels of life and safety.

According to a first aspect of the invention we provide a bearing assembly comprising a bearing having an axial split and an antifriction lining, and an elastic element, the elastic element exerting a force on the bearing acting to close the axial split, the elastic element comprising an elastomeric crown, in which the elastomeric crown is held in relation to the bearing by a bead on the crown located in the split in the bearing.

This is one of two principal ways in which a continuous pressure may be maintained on the rear surface of the bearing. In this first way, the force on the bearing is applied to the shank of the bearing by compression of an elastic element between the bearing and the housing in which it is located. In such a case, the force exerted will follow the intrinsic physical characteristics of the elastic element, and will be affected by any irregularities on the inside surface of the housing. In a second way, the pressure on the bearing is generated solely by the elastic element. In such a case, the pressure exerted is more uniform since it is not affected by any irregularities on the inside surface of the housing. Also, such a method does not depend upon the clearances between the shaft and the housing.

In a first embodiment the bearing also comprises radially outwardly directed flanges. Alternatively the elastomeric crown may be held in relation to the bearing by a number of bosses spaced about the periphery of the bearing.

According to a second aspect of the invention, a bearing assembly comprises a bearing having an axial split and an antifriction lining, and an elastic element, the elastic element exerting a force on the bearing acting to close the axial split, the elastic element comprising a shaped tube of alternating concave and convex portions, in which the shaped tube is held in axial relation to the bearing by a groove provided on the outer surface of the bearing.

According to a third aspect of the present invention, a bearing assembly comprises a bearing having an axial split and an antifriction lining, and an elastic element, the elastic element exerting a force on the bearing acting to close the axial split, in which the elastic element comprises spring means located in grooves in the outer surface of the bearing. Preferably an elastomeric crown is located around the outside of the bearing between the grooves.

According to a forth aspect of the invention we provide a steering column incorporating one or more bearing assemblies according to the earlier aspects of the invention.

The bearing assembly of the present invention advantageously runs with reduced noise and more smoothly than known bearings.

The invention will now be described, by way of example only, with reference to the accompaning in which FIG. 1 shows in section an assembly in accordance with known prior art;

FIG. 2 shows a section along line A—A of FIG. 1;

FIG. 3 shows a section of an assembly in accordance with a first embodiment of the invention;

FIG. 4 shows a section above line B—B of FIG. 3;

FIG. 5 shows a section of an assembly in accordance with a second embodiment of the invention;

FIG. 6 shows a section above line E—E of FIG. 5;

FIG. 7 shows a section of an assembly in accordance with a third embodiment of the invention;

FIG. 8 shows a section along line F—F of FIG. 7;

FIG. 9 shows a section of an assembly in accordance with a forth embodiment of the invention; and FIG. 10 shows a section along line G—G of FIG. 9.

Referring first to FIGS. 1 and 2, there can be seen a shaft 1 held for rotation in a housing 2 by bearing 3, the bearing 3 being non-rotatably held by an elastic element in the form of an elastomeric crown 4 disposed between the bearing 3 and the housing 2. Typically the bearing is manufactured from steel strip. The inner surface of the bearing 3 is lined with an antifriction material, typically a polymer with a low surface hardness, e.g. PTFE, polyacetal, PEEK. The lining is able to run dry or partially lubricated.

In free spread the bearing has an axial split 5 which under pressure may be closed. The peripheral length of the bearing is such that when held jointed, that is such that the axial split is closed, the internal diameter of the bearing is less than the external diameter of the shaft. In use the shaft is inserted into the opening of the bearing pushing the bearing outwards. At the same time the elastic element, in the form of the elastomeric crown 4, between the bearing and the housing is compressed and acts to push the bearing 3 back towards the shaft 1. In this way, the bearing is run without a clearance. Further, any wear in the bearing is retrofitted automatically. As a practical matter the axial split 5 in the bearing 3 is calculated such that the bearing becomes jointed at the end of the life of the bearing.

FIGS. 3 and 4 show a first embodiment of the invention in which an elastic element in the form of a elastomeric crown 14 surrounds a split bearing 13. The bearing is provided with radially outward extending flanges 17,18. The flanges embrace an radially inner portion of the elastomeric crown 14 and prevent relative axial movement of the bearing and the crown. The crown 14 is also provided with an internal axial bead 16. The bead 16 sits in the axial split 15 and abuts each end of each flange 17,18 to prevent relative rotation of the bearing and the crown.

In use a shaft is inserted into the opening of the bearing pushing the bearing outwards. At the same time the elastic element, in the form of the elastomeric crown 14, between the bearing and the housing is compressed and acts to push the bearing 13 back towards the shaft. In this way, the bearing is run without a clearance. Again, any wear in the bearing is retrofitted automatically. Again as a practical matter the axial split 15 in the bearing 13 is calculated such that the bearing becomes jointed at the end of the life of the bearing.

Turning to FIGS. 5 and 6 there is shown a further embodiment of the present invention, in which is shown another elastic element for exerting the force to hold a split bearing 43 jointed. The bearing 43 is formed with an axial split 45. The elastic element is a mounting 44 formed as a shaped tube. The tube comprises in section alternatively concave and convex portions. The concave portions abut the bearing to exert the required force. The bearing and the tube are prevented from relative axial movement, since the tube is lodged within a locking groove 46 formed about the periphery of the bearing.

In use a shaft (not shown) is inserted into the opening of the bearing 43 pushing the bearing outwards. At the same time the elastic element, in the form of shaped tube 44, and in particular the convex portions, between the bearing 44 and the housing (not shown) is compressed and acts to push the bearing 44 back towards the shaft. In this way, the bearing is run without a clearance. Again, any wear in the bearing is retrofitted automatically. Again as a practical matter the axial split 45 in the bearing 44 is calculated such that the bearing becomes jointed at the end of the life of the bearing.

In this embodiment, the necessary force generated to hold the bearing 43 jointed depends upon the elastic deformation energy delivered by the tube 44 between the bearing and the housing and any surface irregularities on the inside of the housing. In previous embodiments, in which an elastomer crown was used, the spring effect will be effected by hardness variations of the material and the maintenance of material properties over the lifetime of the product. In particular, the present embodiment is to be preferred in an operating environment that would lead to the deterioration in the mechanical characteristics of the elastomers used in previous embodiments.

In the following embodiments of the invention, the pressure to close the axial split of the bearing is generated solely by an elastic element. Referring to FIGS. 7 and 8, a bearing 53 having an axial split 55 is shown held jointed by an elastic element comprising a pair of circlips 57,58. The circlips engage in grooves 51,52 provided about the outer periphery of the bearing 53. An elastomeric crown 54 is shown located between the circlips. The sole function of the crown 54 is to position the bearing 53 within the housing; it does not act to close to the axial split of the bearing. Variations in the mechanical characteristics of the elastomeric crown will have no effect upon the force applied to the wear surface of the bearing.

In use a shaft (not shown) is inserted into the opening of the bearing 53 pushing the bearing outwards. At the same time the elastic element, in the form of the circlips 57,58, between the bearing 54 and the housing (not shown) is compressed and acts to push the bearing 54 back towards the shaft. In this way, the bearing is run without a clearance. Again, any wear in the bearing is retrofitted automatically. Again as a practical matter the axial split 55 in the bearing 54 is calculated such that the bearing becomes jointed at the end of the life of the bearing.

A similar arrangement is shown in FIGS. 9 and 10 in which a split bearing 63 having an axial split 65 is held jointed by a pair of wire clips 67,68. The clips are located in grooves 61,62 provided in the periphery of the bearing 63. An elastomeric crown 64 is located between the clips. The sole function of the elastomeric crown 64 is to position the bearing 63 within the housing. Variations in the mechanical characteristics of the elastomeric crown will have no effect upon the force applied to the wear surface of the bearing.

In use a shaft (not shown) is inserted into the opening of the bearing 63 pushing the bearing outwards. At the same time the elastic element, in the form of the wire clips 67,68, between the bearing 64 and the housing (not shown) is compressed and acts to push the bearing 64 back towards the shaft. In this way, the bearing is run without a clearance. Again, any wear in the bearing is retrofitted automatically. Again as a practical matter the axial split 65 in the bearing 64 is calculated such that the bearing becomes jointed at the end of the life of the bearing.

It will be understood that these last two embodiments allow a more precise determination of the forces applied, since metals, e.g. steel have very precise mechanical characteristics. Even with a given quality of steel, the stiffness can be modified by changing the section moment of inertia. Of course, in the earlier embodiments, the pressure on the bearings can be altered by the use of different material grades of polymer.

In use, such as in a steering wheel column more that two bearing assemblies may be required. In the assemblies described the element making an interface between the bearing and the housing allows for a high degree alignment of both bearings. This removes the problems of loads on angle, and thus avoids local wear in the bearings. This leads in turn to an increase in the life of the bearings.

What is claimed is:

1. A bearing assembly comprising a bearing (13) having an axial split (15) and an antifriction lining, and an elastic element (14), the elastic element exerting a force on the bearing acting to close the axial split, the elastic element comprising an elastomeric crown (14), characterised in that the elastomeric crown is held in relation to the bearing by a bead (16) on the crown located in the split (15) of the bearing.

2. A assembly according to claim 1, in which the bearing (13) also comprises radially outwardly directed flanges (17, 18).

3. A assembly according to claim 1, in which the elastomeric crown is held in relation to the bearing by a number of bosses spaced about the periphery of the bearing.

* * * * *